(12) United States Patent
Jacobs

(10) Patent No.: US 6,243,278 B1
(45) Date of Patent: Jun. 5, 2001

(54) DRIVE CIRCUIT FOR SYNCHRONOUS RECTIFIER AND METHOD OF OPERATING THE SAME

(75) Inventor: Mark E. Jacobs, Dallas, TX (US)

(73) Assignee: Tyco Electronics Logistics A.G., Steinach (CH)

(*) Notice: Subject to any disclaimer, the term of this patent is extended or adjusted under 35 U.S.C. 154(b) by 0 days.

(21) Appl. No.: 09/543,369

(22) Filed: Apr. 4, 2000

(51) Int. Cl.[7] .................................................. H02M 7/68
(52) U.S. Cl. ............................................ 363/127; 363/90
(58) Field of Search .................................. 363/78, 80, 81, 363/82, 84, 89, 90, 125, 127

(56) References Cited

U.S. PATENT DOCUMENTS

| | | | |
|---|---|---|---|
| Re. 36,571 | 2/2000 | Rozman | 363/21 |
| 4,899,271 | 2/1990 | Seiresen | 363/126 |
| 5,274,543 | 12/1993 | Loftus, Jr. | 363/127 |
| 5,291,382 | 3/1994 | Cohen | 363/16 |
| 5,303,138 | 4/1994 | Rozman | 363/21 |
| 5,434,768 | 7/1995 | Jitaru et al. | 363/21 |
| 5,528,482 | 6/1996 | Rozman | 363/21 |
| 5,541,828 | 7/1996 | Rozman | 363/21 |
| 5,590,032 | 12/1996 | Bowman et al. | 363/15 |
| 5,625,541 | 4/1997 | Rozman | 363/21 |
| 5,870,299 | 2/1999 | Rozman | 363/127 |
| 5,920,475 | 7/1999 | Boylan et al. | 363/127 |
| 5,940,287 | 8/1999 | Brkovic | 363/127 |
| 5,956,245 | 9/1999 | Rozman | 363/89 |
| 6,002,597 | 12/1999 | Rozman | 363/21 |
| 6,011,703 | 1/2000 | Boylan et al. | 363/21 |
| 6,038,145 | 3/2000 | Jacobs et al. | 363/20 |
| 6,069,799 | 5/2000 | Bowman et al. | 363/20 |
| 6,091,616 | 7/2000 | Jacobs et al. | 363/127 |
| 6,108,215 * | 8/2000 | Kates et al. | 363/17 |

OTHER PUBLICATIONS

"A MOS Gate Drive with Resonant Transitions" by Dragan Maksimovic; IEEE 1991; pp. 527–532.

* cited by examiner

Primary Examiner—Jessica Han

(57) ABSTRACT

A drive circuit for driving a rectifier switch, a method of driving the rectifier switch and a power converter employing the drive circuit or the method. In one embodiment, the drive circuit includes (1) a blocking diode couplable to a bias energy source and configured to block reverse current flow thereto, (2) an inductor coupled to the rectifier switch, and (3) a switching circuit, coupled to the blocking diode and the inductor, configured to: (3a) resonantly transfer energy from the bias energy source to a control terminal of the rectifier switch via the inductor to turn the rectifier switch ON, and (3b) resonantly discharge the energy through the control terminal to turn the rectifier switch OFF.

40 Claims, 5 Drawing Sheets

DRIVE CIRCUIT FOR SYNCHRONOUS RECTIFIER AND METHOD OF OPERATING THE SAME

TECHNICAL FIELD OF THE INVENTION

The present invention is directed, in general, to power conversion and, more specifically, to a drive circuit for a synchronous rectifier in a power converter and a power converter employing the same.

BACKGROUND OF THE INVENTION

A power converter is a power processing circuit that converts an input voltage waveform into a specified output voltage waveform. In many applications requiring a DC output, switched-mode DC—DC converters are frequently employed to advantage. DC—DC converters generally include an inverter, a transformer having a primary winding coupled to the inverter and a rectifier coupled to a secondary winding of the transformer. The inverter generally includes a switching device, such as a field-effect transistor (FET), that converts the DC input voltage to an AC voltage. The transformer then transforms the AC voltage to another value and the rectifier generates the desired DC voltage at the output of the DC—DC converter.

Conventionally, the rectifier includes passive rectifying devices, such as Schottky diodes, that conduct the load current only when forward-biased in response to the input waveform to the rectifier. Passive rectifying devices, however, generally cannot achieve forward voltage drops of less than about 0.35 volts, thereby substantially limiting a conversion efficiency of the DC—DC converter. To achieve an acceptable level of efficiency, DC—DC converters that provide low output-voltages (e.g., 1 volt) often require rectifying devices that have forward voltage drops of less than about 0.1 volts. The DC—DC converters, therefore, generally use synchronous rectifiers. A synchronous rectifier replaces the passive rectifying devices of the conventional rectifier with rectifier switches, such as FETs or other controllable switches, that are periodically driven into conduction and non-conduction modes in synchronism with the periodic waveform of the AC voltage. The rectifier switches exhibit resistive-conductive properties and may thereby avoid the higher forward voltage drops inherent in the passive rectifying devices.

One difficulty with using a rectifier switch (e.g., an n-channel silicon FET) is the need to provide a drive signal that alternates between a positive voltage to drive the device into the conduction mode and a zero or negative voltage to drive the device into the non-conduction mode. Of course, depending on the type of rectifier switch, an opposite drive polarity may be employed. Although a capacitive charge within the rectifier switch may only be 30 to 50 nanocoulombs per device (rectifier switch), in situations where as many as a dozen or more devices may be used, a high drive current may be required for a brief period of time to change conduction modes.

The power required by the process of charging the control terminal(s) of the rectifier switch(s) (gate terminal, in the case of a FET) may be represented as the drive bias voltage multiplied by the total gate charge multiplied by the switching frequency and divided by the efficiency of the bias energy source employed. The power required may, for example, be equivalent to: $50*10^{-9}$ coulombs$\times$8 volts$\times$500,000 Hz$\times$12 devices/0.8 bias efficiency=3 watts. In addition, typical drive currents may be 10 amperes or greater, lasting for tens of nanoseconds. The need to provide substantial power to the rectifier switch(s) to change conduction modes thus reduces some of the advantages of the synchronous rectifier.

Accordingly, what is needed in the art is a drive circuit for driving the rectifier switch of a synchronous rectifier that overcomes the deficiencies of the prior art.

SUMMARY OF THE INVENTION

To address the above-discussed deficiencies of the prior art, the present invention provides, for use with a synchronous rectifier having at least one rectifier switch, a drive circuit for driving the rectifier switch. In one embodiment, the drive circuit includes (1) a blocking diode couplable to a bias energy source and configured to block reverse current flow thereto, (2) an inductor coupled to the rectifier switch, (3) a switching circuit, coupled to the blocking diode and the inductor, configured to: (3a) resonantly transfer energy from the bias energy source to a control terminal of the rectifier switch via the inductor to turn the rectifier switch ON, and (3b) resonantly discharge the energy through the control terminal to turn the rectifier switch OFF.

The present invention introduces, in one aspect, a drive circuit that employs resonance to transfer energy to and from a rectifier switch in a substantially lossless manner. The resonance is a result of the interaction between, among other things, the inductor of the drive circuit and a gate capacitance of the rectifier switch.

In one embodiment of the present invention, the switching circuit includes series-coupled first and second switches. The first switch is configured to resonantly transfer the energy from the bias energy source to the control terminal, via the inductor, to turn the rectifier switch ON. The second switch is configured to resonantly discharge the energy through the control terminal to turn the rectifier switch OFF. The rectifier switch may thus be turned ON or OFF by activating an appropriate one of the first and second switches of the switching circuit.

In a more specific embodiment, wherein the blocking diode is a first blocking diode coupled to a first terminal of the bias energy source, the drive circuit further includes a second blocking diode coupled between the switching circuit and a second terminal of the bias energy source. The second blocking diode may thus protect the switching circuit from reverse current flow.

In one embodiment of the present invention, the bias energy source includes a bias capacitor coupled there across and configured to store at least a portion of the energy. The bias capacitor is, in one embodiment, sufficiently large such that it is capable of acquiring a nominally constant voltage throughout the resonant operational cycles of the drive circuit.

In one embodiment of the present invention, the drive circuit includes a blocking capacitor coupled between the switching circuit and the control terminal of the rectifier switch. The blocking capacitor provides DC isolation between the switching circuit and the control terminal of the rectifier switch. The blocking capacitor may acquire a DC voltage during the operation of the drive circuit.

In one embodiment of the present invention, the drive circuit includes a clamping circuit coupled to the rectifier switch. The clamping circuit is configured to clamp a lower or upper voltage excursion of a drive signal supplied to the control terminal of the rectifier switch. In a related embodiment the clamping circuit includes a diode. In another related embodiment, the clamping circuit further includes a Zener diode series-coupled in opposition to the diode and is configured to clamp an upper or lower voltage excursion of the drive signal supplied to the control terminal of the rectifier switch. In another related embodiment, the drive circuit includes a voltage source coupled to the clamping circuit. The voltage source is employable to set the clamping voltage of the clamping circuit to a predetermined level. In another embodiment, the clamping circuit further includes a bleeder resistor coupled to the control terminal of the rectifier switch. The bleeder resistor provides a leakage path for voltages that may be present at the control terminal of the rectifier switch.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
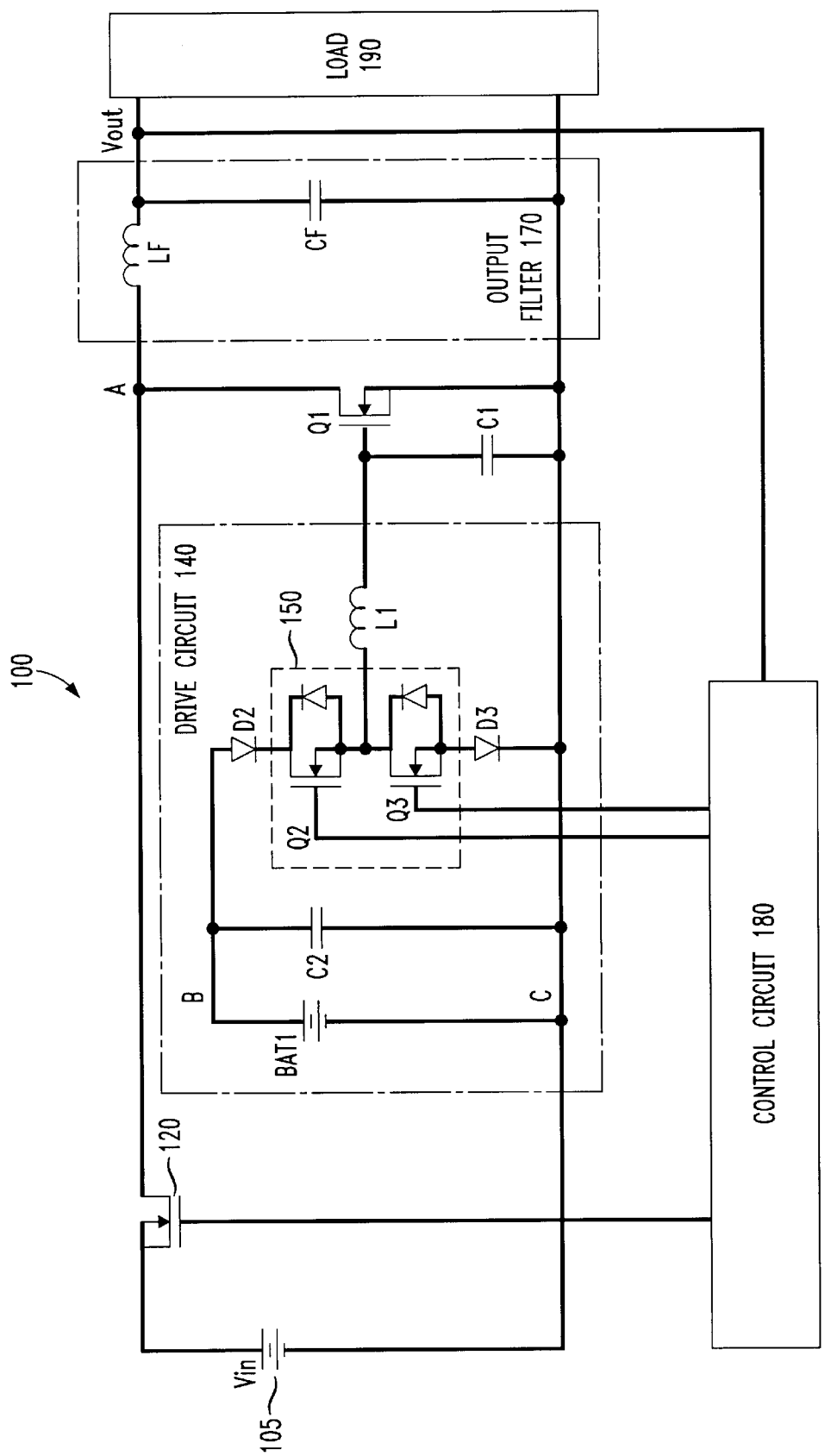
FIG. 1 illustrates a schematic diagram of an embodiment of a power converter constructed according to the principles of the present invention.

Referring initially to FIG. 1, illustrated is a schematic diagram of an embodiment of a power converter 100 constructed according to the principles of the present invention. The power converter 100 has an input couplable to a source of electrical power 105 having an input voltage Vin and an output that provides an output voltage Vout to a load 190. The power converter 100 includes a power switch 120 coupled to the input. In the illustrated embodiment, the power switch 120 is a metal oxide semiconductor field-effect transistor (MOSFET). Of course, other controllable switches, such as bipolar junction transistors (BJTs) and gallium arsenide field-effect transistors (GaAsFETs) are well within the broad scope of the present invention.

The power converter 100 further includes an output filter 170, having a filter inductor LF and a filter capacitor CF, coupled to the output. The power converter 100 further includes a synchronous rectifier coupled to a node A between the power switch 120 and the filter inductor LF. In the illustrated embodiment, the synchronous rectifier includes a rectifier switch Q1. While the illustrated rectifier switch Q1 is an n-channel metal oxide semiconductor field-effect transistor (MOSFET), other controllable switches, such as bipolar junction transistors (BJTs) and gallium arsenide field-effect transistors (GaAsFETs), are well within the broad scope of the present invention. The rectifier switch Q1 has an intrinsic input capacitance therein, explicitly represented in FIG. 1 by an intrinsic capacitor C1 coupled to a control terminal of the rectifier switch Q1. Of course, the synchronous rectifier may include any number of rectifier switches as may be required by a particular application.

The power converter 100 further includes a drive circuit 140 that generates and delivers a drive signal to drive the control terminal of the rectifier switch Q1. The power converter 100 still further includes a control circuit 180 coupled to the power switch 120. The control circuit 180 monitors the output voltage Vout and adjusts the duty cycle of the power switch 120 to regulate the output voltage Vout despite variations in the input voltage Vin or the load 190. Of course, the control circuit 180 may monitor other control points within the power converter 100 as desired.

The drive circuit 140 includes a bias energy source that, in the illustrated embodiment, is a battery BAT1. Of course, other types of energy sources, such as a typical internal bias supply or an external bias supply, are well within the broad scope of the present invention. The bias energy source BAT1 includes an optional bias capacitor C2 coupled thereacross. The bias capacitor C2 may be employed to store a portion of the energy supplied by the bias energy source BAT1. The bias capacitor C2 is preferably sufficiently large such that it is capable of acquiring a nominally constant voltage throughout the resonant operational cycles of the drive circuit 140 and the rectifier switch Q1.

The drive circuit 140 further includes a first blocking diode D2 coupled to a first terminal B of the bias energy source BAT1 and configured to block reverse current flow thereto. The drive circuit 140 further includes an inductor L1 coupled to the rectifier switch Q1. The drive circuit 140 still further includes a switching circuit 150 that, in the illustrated embodiment, is interposed between the first blocking diode D2 and the inductor L1.

The switching circuit 150 includes series-coupled first and second switches Q2, Q3. The first switch Q2 is configured to resonantly transfer energy from the bias energy source BAT1 to the control terminal of the rectifier switch Q1 via the inductor L1 to turn the rectifier switch Q1 ON. The second switch Q3 is configured to resonantly discharge the energy through the control terminal of the rectifier switch Q1 to turn the rectifier switch Q1 OFF. While the first and second switches Q2, Q3 are illustrated as n-channel metal oxide semiconductor field-effect transistors (MOSFETs), other controllable switches, such as bipolar junction transistors (BJTs) and gallium arsenide field-effect transistors (GaAsFETs), are well within the broad scope of the present invention.

The drive circuit 140 further includes a second blocking diode D3 coupled between the switching circuit 150 and a second terminal C of the bias energy source BAT1. The second blocking diode D3 may thus protect the switching circuit 150 from reverse current flow.

The power converter 100 operates as follows. During a first interval, when the power switch 120 is ON (conducting), the source 105 provides energy to the load 190 as well as to the filter inductor LF. Then, during a second interval when the power switch 120 is OFF (non-conducting), the inductor current flows through the rectifier switch Q1, transferring some of its stored energy to the load 190.

The rectifier switch Q1 may have a substantial intrinsic capacitance (represented by the intrinsic capacitor C1). The amount of energy that is stored in the intrinsic capacitor C1 each switching cycle (as the rectifier switch Q1 is turned ON and OFF) is related to the conduction losses experienced by the rectifier switch Q1. To increase the efficiency of the power converter 100, a substantial portion of the energy stored in the intrinsic capacitor C1 should be recovered each switching cycle. Further, the turn ON and turn OFF of the rectifier switch Q1 should be synchronized with the operation of the power switch 120.

The drive circuit 140 turns ON the first switch Q2 of the switching circuit 150 to form a first conductive path for energy to be resonantly transferred from the bias energy source BAT1, through the first blocking diode D2, the first switch Q2 and the inductor L1, to the control terminal of the rectifier switch Q1. The energy charges the intrinsic capacitor C1 (of the rectifier switch Q1) causing the voltage at the control terminal of the rectifier switch Q1 to increase thus turning ON the rectifier switch Q1. The first blocking diode D2 blocks the reverse flow of current to the bias energy source BAT1, resulting in a first half-cycle of resonant current flow to charge the intrinsic capacitor C1. Additionally, the second switch Q3 is OFF, also blocking current flow. Once the intrinsic capacitor C1 has been resonantly charged, the first switch Q2 can be turned OFF (after the first half-cycle of resonant current flow).

When the rectifier switch Q1 is to be turned OFF, the second switch Q3 is turned ON to form a second conductive path for energy to be resonantly discharged through the control terminal of the rectifier switch Q1. The turn ON of the second switch Q3 allows a second half-cycle of resonant current flow to discharge the intrinsic capacitor C1. The second blocking diode D3 blocks reverse current flow to the switching circuit 150 and thus terminates the second half-cycle of resonant current flow. Once the intrinsic capacitor C1 has been resonantly discharged, the second switch Q3 can be turned OFF (after the second half-cycle of resonant current flow).

By employing a resonance between the inductor L1 and the intrinsic capacitor C1, the transfer of energy to and from the rectifier switch Q1 may be done in a substantially lossless manner.

Figure 2:
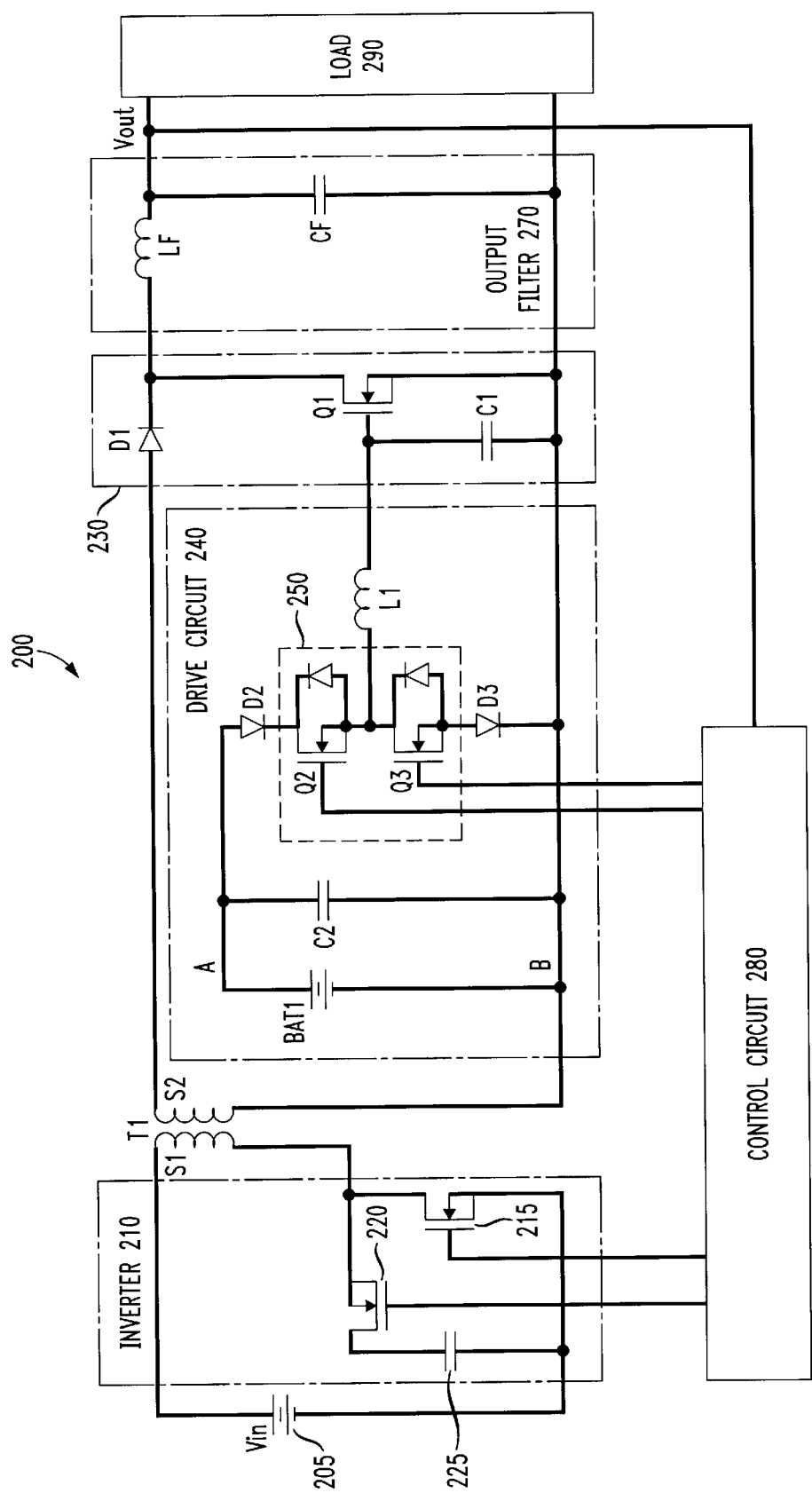
FIG. 2 illustrates a schematic diagram of another embodiment of a power converter constructed according to the principles of the present invention.

Turning now to FIG. 2, illustrated is a schematic diagram of another embodiment of a power converter 200 constructed according to the principles of the present invention. The power converter 200 has an input couplable to a source of electrical power 205 having an input voltage Vin and an output that provides an output voltage Vout to a load 290. The power converter 200 includes an inverter 210 coupled to the input. The power converter 200 further includes a transformer T1 having a primary winding S1 coupled to the inverter 210 and a secondary winding S2. The power converter 200 further includes a synchronous rectifier 230 having a rectifying diode D1 and a rectifier switch Q1. The synchronous rectifier 230 is coupled to the secondary winding S2 and rectifies a periodic waveform supplied by the secondary winding S2.

The power converter 200 further includes a drive circuit 240 that drives a control terminal of the rectifier switch Q1. In the illustrated embodiment, the drive circuit 240 generates and delivers a drive signal to the control terminal of the rectifier switch Q1. The power converter 200 further includes an output filter 270, having a filter inductor LF and a filter capacitor CF, that filters the rectified waveform to provide the output voltage Vout at the output of the power converter 200. The power converter 200 still further includes a control circuit 280, coupled to the inverter 210, that monitors the output voltage Vout and adjusts the switching of the inverter 210 to regulate the output voltage Vout despite variations in the input voltage Vin or the load 290. Of course, the control circuit 280 may monitor other control points within the power converter 200 as desired.

In the illustrated embodiment, the inverter 210 includes a power switch 215 coupled to the input of the power converter 200. The control circuit 280 periodically switches the power switch 215 to apply the input voltage Vin across the primary winding S1. The inverter 210 further includes a series-coupled auxiliary switch 220 and capacitor 225, coupled across the power switch 215, that clamps a voltage across the windings of the transformer T1 when the power switch 215 is OFF (non-conducting). While the embodiment illustrated and described contains an inverter 210 with an active clamp forward switching topology, those skilled in. the art will realize that the principles of the present invention may be employed with a wide variety of switching topologies, including those not employing an active clamp.

The rectifier switch Q1 of the synchronous rectifier 230 is coupled to the secondary winding S2. In the illustrated embodiment, the rectifier switch Q1 is an n-channel metal oxide semiconductor field-effect transistor (MOSFET) controllably switched by the drive circuit 240 to rectify the periodic waveform supplied by the secondary winding S2. Of course, other controllable switches, such as bipolar junction transistors (BJTs) and gallium arsenide field-effect transistors (GaAsFETs), are well within the broad scope of the present invention. The rectifier switch Q1 has an intrinsic capacitance therein, explicitly represented in FIG. 2 by an intrinsic capacitor C1 coupled to the control terminal of the rectifier switch Q1.

The drive circuit 240 includes a bias energy source that, in the illustrated embodiment, is a battery BAT1. Of course, other types of energy sources, such as a typical internal bias supply or an external bias supply, are well within the broad scope of the present invention. The bias energy source BAT1 includes an optional bias capacitor C2 coupled thereacross. The bias capacitor C2 may be employed to store a portion of the energy supplied by the bias energy source BAT1 The bias capacitor C2 is preferably sufficiently large such that it is capable of acquiring a nominally constant voltage throughout the resonant operational cycles of the drive circuit 240 and the rectifier switch Q1.

The drive circuit 240 further includes a first blocking diode D2 coupled to a first terminal A of the bias energy source BAT1 and configured to block reverse current flow thereto. The drive circuit 240 further includes an inductor L1 coupled to the rectifier switch Q1. The drive circuit 240 still further includes a switching circuit 250 that, in the illustrated embodiment, is interposed between the first blocking diode D2 and the inductor L1.

The switching circuit 250 includes series-coupled first and second switches Q2, Q3. The first switch Q2 is configured to resonantly transfer energy from the bias energy source BAT1 to the control terminal of the rectifier switch Q1 via the inductor L1 to turn the rectifier switch Q1 ON. The second switch Q3 is configured to resonantly discharge the energy through the control terminal of the rectifier switch Q1 to turn the rectifier switch Q1 OFF. While the first and second switches Q2, Q3 are illustrated as n-channel metal oxide semiconductor field-effect transistors (MOSFETs), other controllable switches, such as bipolar junction transistors (BJTs) and gallium arsenide field-effect transistors (GaAsFETs), are well within the broad scope of the present invention.

The drive circuit 240 further includes second blocking diode D3 coupled between the switching circuit 250 and a second terminal B of the bias energy source BAT1. The second blocking diode D3 may thus protect the switching circuit 250 from reverse current flow.

The power converter 200 operates as follows. In steady-state operation, the power switch 215 is ON (conducting) for a primary duty cycle D to apply the DC input voltage Vin across the primary winding S1. The power switch 215 is then OFF (non-conducting) for a complementary duty cycle 1-D to allow the auxiliary switch 220 to reset the transformer T1.

The rectifier switch Q1 may have a substantial intrinsic capacitance (represented by the intrinsic capacitor C1). The amount of energy that is stored in the intrinsic capacitor C1 each switching cycle (as the rectifier switch Q1 is turned ON and OFF) is related to the conduction losses experienced by the rectifier switch Q1. To increase the efficiency of the power converter 200, a substantial portion of the energy stored in the intrinsic capacitor C1 should be recovered each switching cycle. Further, the turn ON and turn OFF of the rectifier switch Q1 should be synchronized with the operation of the power switch 215 and the auxiliary switch 220.

The drive circuit 240. turns ON the first switch Q2 of the switching circuit 250 to form a first conductive path for energy to be resonantly transferred from the bias energy source BAT1, through the first blocking diode D2, the first switch Q2 and the inductor L1, to the control terminal of the rectifier switch Q1. The energy charges the intrinsic capacitor C1 (of the rectifier switch Q1) causing the voltage at the control terminal of the rectifier switch Q1 to increase thus turning ON the rectifier switch Q1. The first blocking diode D2 blocks the reverse flow of current to the bias energy source BAT1, resulting in a first half-cycle of resonant current flow to charge the intrinsic capacitor C1. Additionally, the second switch Q3 is OFF, also blocking current flow. Once the intrinsic capacitor C1 has been resonantly charged, the first switch Q2 can be turned OFF (after the first half-cycle of resonant current flow).

When the rectifier switch Q1 is to be turned OFF, the second switch Q3 is turned ON to form a second conductive path for energy to be resonantly discharged through the control terminal of the rectifier switch Q1. The turn ON of the second switch Q3 allows a second half-cycle of resonant current flow to discharge the intrinsic capacitor C1. The second blocking diode D3 blocks reverse current flow to the switching circuit 250 and thus terminates the second half-cycle of resonant current flow. Once the intrinsic capacitor C1 has been resonantly discharged, the second switch Q3 can be turned OFF (after the second half-cycle of resonant current flow).

By employing a resonance between the inductor L1 and the intrinsic capacitor C1, the transfer of energy to and from the rectifier switch Q1 may be done in a substantially lossless manner.

Figure 3A:
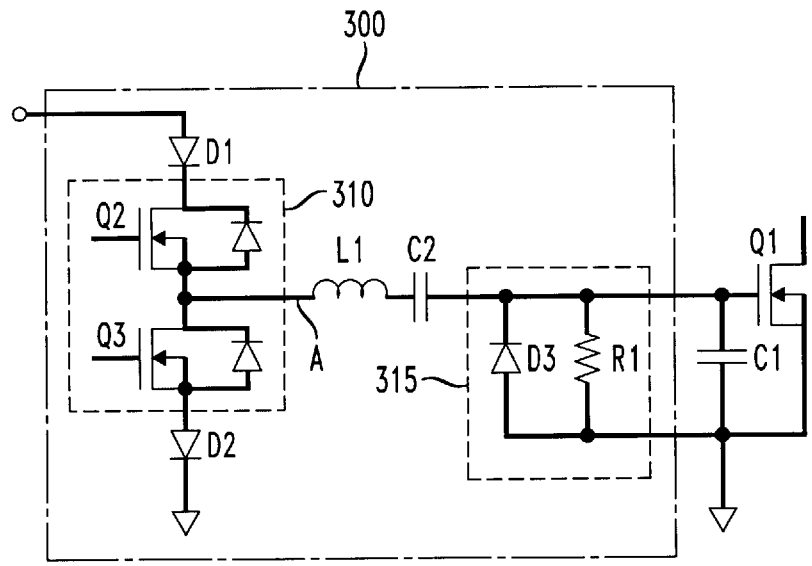
FIGS. 3A–D illustrate schematic diagrams of various embodiments of drive circuits constructed according to the principles of the present invention.

Turning now to FIGS. 3A–3D, illustrated are schematic diagrams of various embodiments of drive circuits 300, 325, 350, 375 constructed according to the principles of the present invention. The drive circuit 300 illustrated in FIG. 3A is configured to drive a rectifier switch Q1 (having an intrinsic capacitance represented by intrinsic capacitor C1). The drive circuit 300 is couplable to a bias energy source (not shown) and receives energy therefrom. The drive circuit 300 includes a first blocking diode D1 coupled to the bias energy source and configured to block reverse current flow thereto. The drive circuit 300 further includes a switching circuit 310, having series-coupled first and second switches Q2, Q3, coupled to the first blocking diode D1. The switching circuit 310 is analogous to the switching circuit 250 illustrated and described with respect to FIG. 2 and therefore will not hereinafter be described in detail.

The drive circuit 300 further includes a second blocking diode D2 coupled to the switching circuit 310 and configured to block reverse current flow thereto. The drive circuit 300 further includes an inductor L1 coupled to a node A between the first and second switches Q2, Q3. The drive circuit 300 further includes a blocking capacitor C2 coupled between the switching circuit 310 and a control terminal the rectifier switch Q1. The blocking capacitor C2 is employable to provide DC isolation between the switching circuit 310 and the control terminal of the rectifier switch Q1. The blocking capacitor may acquire a DC voltage during the operation of the drive circuit 300.

The drive circuit 300 further includes a clamping circuit 315 coupled to the rectifier switch Q1. In the illustrated embodiment, the clamping circuit 315 includes a diode D3 configured to clamp a lower voltage excursion of a drive signal supplied to the control terminal of the rectifier switch Q1 by the drive circuit 300. By limiting a negative excursion of the drive signal, the clamping circuit 315 may reduce an amount of charge transferred to the rectifier switch Q1 thereby increasing an overall efficiency of the synchronous rectifier employing the rectifier switch Q1. Alternatively, the diode D3 may be configured to clamp an upper voltage excursion of the drive signal.

The diode D3 is further configured to allow the blocking capacitor C2 to acquire an appropriate charge such that the blocking capacitor C2 may provide a small negative voltage to the control terminal of the rectifier switch Q1 when the rectifier switch Q1 is turned OFF.

The clamping circuit 315 further includes a bleeder resistor R1 coupled to the control terminal of the rectifier switch Q1. The bleeder resistor is employed to provide a leakage path for voltages that may be present at the control terminal of the rectifier switch Q1.

Figure 3B:
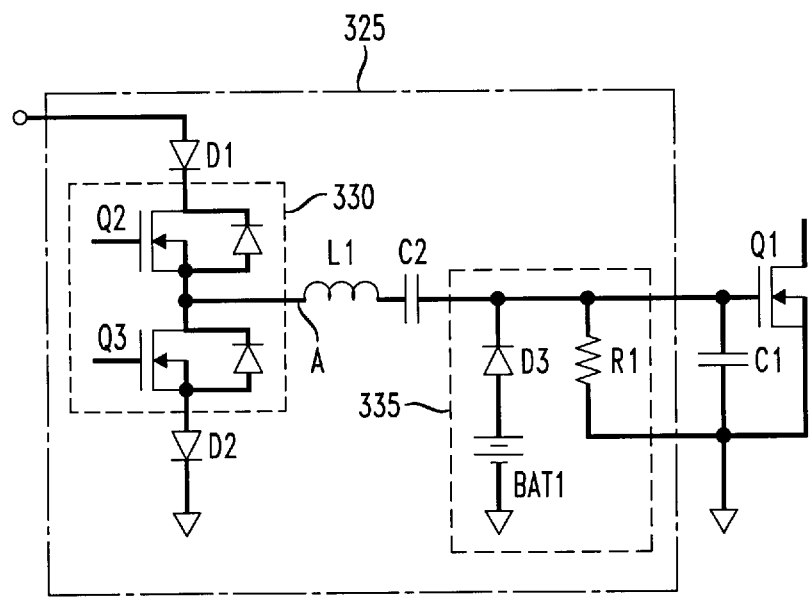

Turning now to FIG. 3B, illustrated is another embodiment of a drive circuit 325 constructed according to the principles of the present invention. The drive circuit 325 is analogous to the drive circuit 300 illustrated and described with respect to FIG. 3A with variations as hereinafter described.

The drive circuit 325 includes a first blocking diode D1 couplable to a bias energy source (not shown) and configured to block reverse current flow thereto. The drive circuit 325 further includes a switching circuit 330, having series-coupled first and second switches Q2, Q3, coupled to the first blocking diode D1. The drive circuit 325 further includes a second blocking diode D2 coupled to the switching circuit 330 and configured to block reverse current flow thereto. The drive circuit 325 further includes an inductor L1 coupled to a node A between the first and second switches Q2, Q3. The drive circuit 325 further includes a blocking capacitor C2 coupled between the switching circuit 330 and a control terminal the rectifier switch Q1.

The drive circuit 325 further includes a clamping circuit 335 coupled to the rectifier switch Q1. In the illustrated embodiment, the clamping circuit 335 includes a diode D3 configured to clamp a lower voltage excursion of a drive signal supplied to the control terminal of the rectifier switch Q1 by the drive circuit 325. By limiting a negative excursion of the drive signal, the clamping circuit 335 may reduce an amount of charge transferred to the rectifier switch Q1 thereby increasing an overall efficiency of the synchronous rectifier employing the rectifier switch Q1. Alternatively, the diode D3 may be configured to clamp an upper voltage excursion of the drive signal.

In the illustrated embodiment, the diode D3 is coupled to a voltage source (represented by battery BAT1). By adjusting a voltage of the voltage source BAT1, a turn-OFF voltage of the rectifier switch Q1 may be correspondingly adjusted. The clamping circuit 335 further includes a bleeder resistor R1 coupled to the control terminal of the rectifier switch Q1. The bleeder resistor R1 is employed to provide a leakage path for voltages that may be present at the control terminal of the rectifier switch Q1.

Figure 3C:
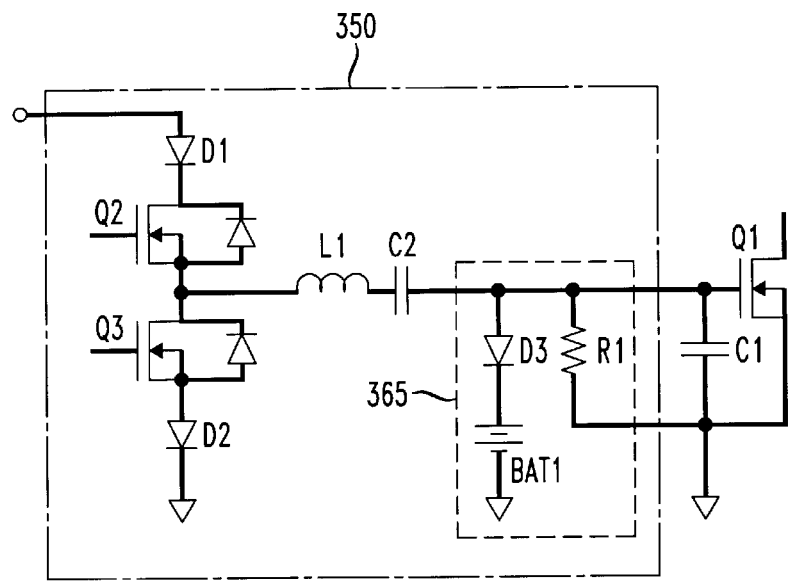

Turning now to FIG. 3C, illustrated is another embodiment of a drive circuit 350 constructed according to the principles of the present invention. The drive circuit 350 is analogous to the drive circuit 325 illustrated and described with respect to FIG. 3B with variations as hereinafter described.

The drive circuit 350 includes a clamping circuit 365 coupled to the rectifier switch Q1. The clamping circuit 365 is substantially similar to the clamping circuit 335 illustrated and described with respect to FIG. 3B. The clamping circuit 365 includes a diode D3 coupled to a voltage source (represented by battery BAT1). The polarity of the diode D3 is reversed from the configuration illustrated and described with respect to FIG. 3B to allow the diode D3 to clamp an upper voltage excursion of a drive signal supplied to the control terminal of the rectifier switch Q1 by the drive circuit 350. The upper voltage excursion is substantially equal to a voltage of the voltage source BAT plus about a diode voltage drop.

Figure 3D:
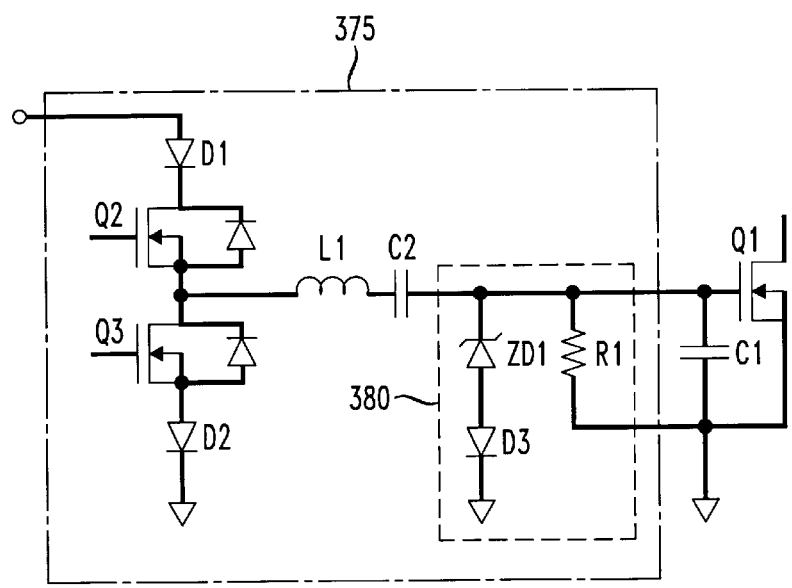

Turning now to FIG. 3D, illustrated is another embodiment of a drive circuit 375 constructed according to the principles of the present invention. The drive circuit 375 is analogous to the drive circuit 350 illustrated and described with respect to FIG. 3C with variations as hereinafter described.

The drive circuit 375 includes a clamping circuit 380 coupled to the rectifier switch Q1. The clamping circuit 380 is substantially similar to the clamping circuit 335 illustrated and described with respect to FIG. 3C. The clamping circuit 380 includes a Zener diode ZD1 series-coupled in opposition to a diode D3. The Zener diode ZD1 is configured to clamp an upper voltage excursion of a drive signal supplied to the control terminal of the rectifier switch Q1 by the drive circuit 375. The diode D3 is configured to prevent the Zener diode ZD1 from conducting in a forward direction. Alternatively, the Zener diode ZD1 may be configured to clamp a lower voltage excursion of the drive signal.

Figure 4:
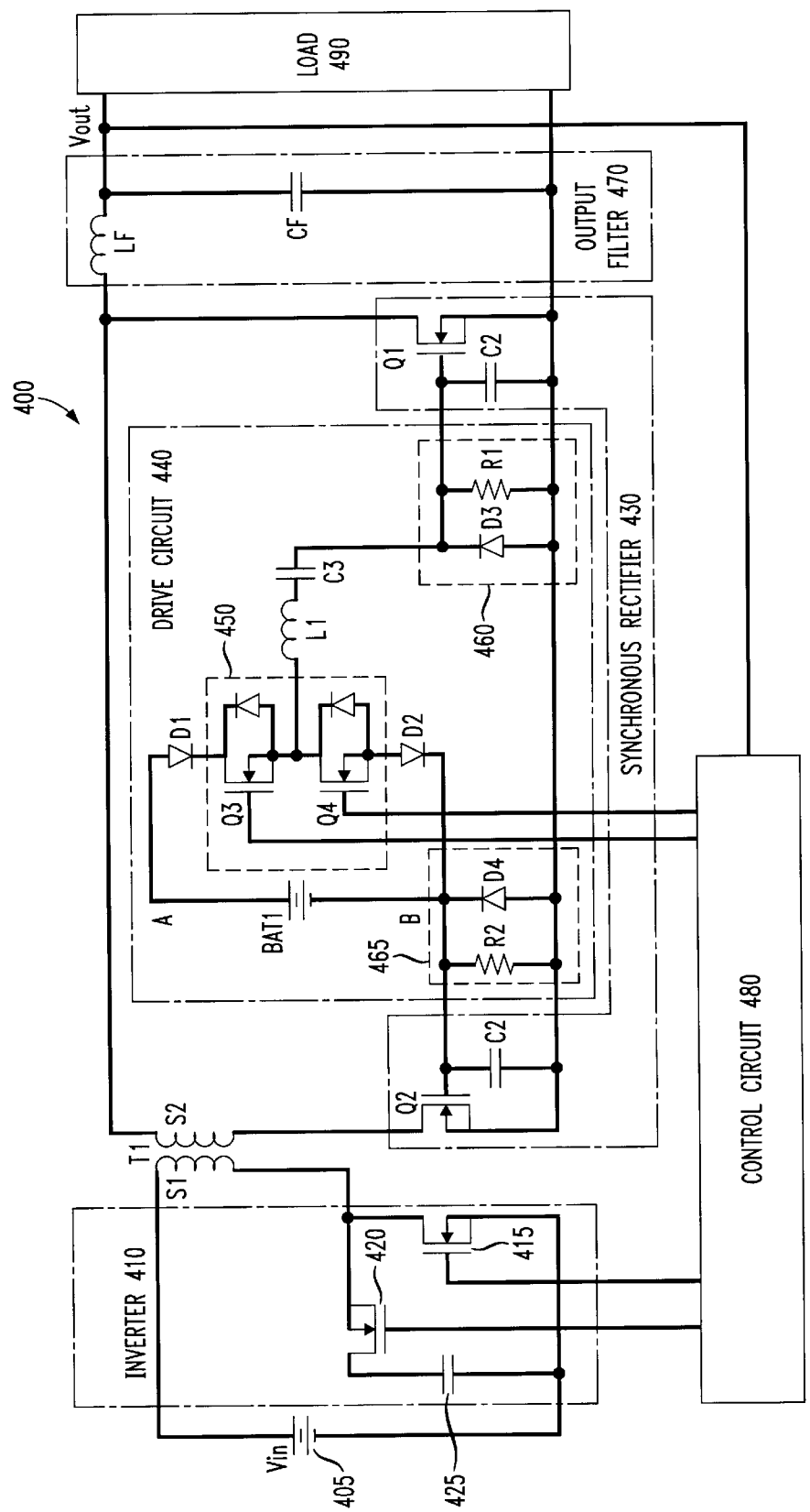
FIG. 4 illustrates a schematic diagram of another embodiment of a power converter constructed according to the principles of the present invention.

Turning now to FIG. 4, illustrated is a schematic diagram of another embodiment of a power converter 400 constructed according 1; to the principles of the present invention. The power converter 400 has an input couplable to a source of electrical power 405 having an input voltage Vin and an output that provides an output voltage Vout to a load 490. The power converter 400 includes an inverter 410 coupled to the input. The power converter 400 further includes a transformer T1 having a primary winding S1 coupled to the inverter 410 and a secondary winding S2. The power converter 400 further includes a synchronous rectifier 430, having first and second rectifier switches Q1, Q2. The synchronous rectifier 430 is coupled to the secondary winding S2 and rectifies a periodic waveform supplied by the secondary winding S2.

The power converter 400 further includes a drive circuit 440 that generates and delivers first and second drive signals to drive the first and second control terminals of the first and second rectifier switches Q1, Q2. The power converter 400 further includes an output filter 470, having a filter inductor LF and a filter capacitor CF, that filters the rectified waveform to provide the output voltage Vout at the output of the power converter 400. The power converter 400 still further includes a control circuit 480, coupled to the inverter 410, that monitors the output voltage Vout and adjusts the switching of inverter 410 to regulate the output voltage Vout despite variations in the input voltage Vin or the load 490. Of course, the control circuit 480 may monitor other control points within the power converter 400 as desired.

In the illustrated embodiment, the inverter 410 includes a power switch 415 coupled to the input of the power converter 400. The control circuit 480 periodically switches the power switch 415 to apply the input voltage Vin across the primary winding S1. The inverter 410 further includes a series-coupled auxiliary switch 420 and capacitor 425, coupled across the power switch 415, that clamps a voltage across the windings of the transformer T1 when the power switch 415 is OFF (non-conducting).

The first and second rectifier switches Q1, Q2 of the synchronous rectifier 430 are coupled to the secondary winding S2. In the illustrated embodiment, both the first and second rectifier switches Q1, Q2 are n-channel metal oxide semiconductor field-effect transistors (MOSFETs) controllably switched by the drive circuit 440 to rectify the periodic waveform supplied by the secondary winding S2. Of course, other controllable switches, such as bipolar junction transistors (BJTS) and gallium arsenide field-effect transistors (GaAsFETs), are well within the broad scope of the present invention. The first and second rectifier switches Q1, Q2 have intrinsic capacitances therein, explicitly represented by first and second intrinsic capacitors C1, C2 respectively coupled to the first and second control terminals of the first and second rectifier switches Q1, Q2.

The drive circuit 440 is couplable to a bias energy source that, in the illustrated embodiment, is a battery BAT1. Of course, other types of energy sources, such as a typical internal bias supply or an external energy source, are well within the broad scope of the present invention. The drive circuit 440 further includes a first blocking diode D1 coupled to a first terminal A of the bias energy source BAT1 and configured to block reverse current flow thereto. The drive circuit 440 further includes an inductor L1 and a blocking capacitor C3 coupled to the rectifier switch Q1. The blocking capacitor C3 is employable to provide DC isolation between a switching circuit 450 (interposed between the first blocking diode D1 and the inductor L1) and the first control terminal (of the first rectifier switch Q1).

In the illustrated embodiment, the switching circuit 4t50 includes series-coupled first and second switches Q3, Q4. The first switch Q3 is configured to resonantly transfer energy from the bias energy source BAT1 and the second control terminal (of the second rectifier switch Q2) to the first control terminal (of the first rectifier switch Q1), via the inductor L1, to turn the second rectifier switch Q2 OFF and to turn the first rectifier switch Q1 ON. The second switch Q4 is configured to resonantly transfer the energy through the first control terminal (of the first rectifier switch Q1) to the second control terminal (of the second rectifier switch Q2) to turn the first rectifier switch Q1 OFF and to turn the second rectifier switch Q2 ON. While the first and second switches Q2, Q3 are illustrated as n-channel metal oxide semiconductor field-effect transistors (MOSFETs), other controllable switches, such as bipolar junction transistors (BJTs) and gallium arsenide field-effect transistors (GaAsFETs), are well within the broad scope of the present invention.

The drive circuit 440 further includes second blocking diode D2 coupled between the switching circuit 450 and a second terminal B of the bias energy source BAT1. The second blocking diode D2 may thus protect the switching circuit 450 from reverse current flow.

The drive circuit 440 further includes first and second clamping circuits 460, 465, respectively coupled to the first and second rectifier switches Q1, Q2. In the illustrated embodiment, the first clamping circuit 460 includes a diode D3 configured to clamp a lower voltage excursion of a first drive signal supplied to the first control terminal (of the first rectifier switch Q1) by the drive circuit 440. The second clamping circuit 465 includes a diode D4 configured to clamp a lower voltage excursion of a second drive signal supplied to the second control terminal (of the second rectifier switch Q2) by the drive circuit 440. By limiting a negative excursion of the first and second drive signals, the first and second clamping circuits 460, 465 may reduce an amount of charge transferred to the respective first and second rectifier switches Q1, Q2 thereby increasing an overall efficiency of the synchronous rectifier 430. Alternatively, the first and second clamping circuit 460, 465 may be configured to clamp upper voltage excursions of the first and second drive signals, respectively.

The first clamping circuit 460 further includes a bleeder resistor R1 coupled to the first control terminal (of the first rectifier switch Q1). The second clamping circuit 465 includes a bleeder resistor R2 coupled to the second control terminal (of the second rectifier switch Q2). The bleeder resistors R1, R2 are employed to respectively provide first and second leakage paths for voltages that may be present at the first and second control terminals of the first and second rectifier switches Q1, Q2.

The power converter 400 operates as follows. In steady-state operation, the power switch 415 is ON (conducting) for a primary duty cycle D to apply the DC input voltage Vin across the primary winding S1. The power switch 415 is then OFF (non-conducting) for a complementary duty cycle 1-D to allow the auxiliary switch 420 to reset the transformer T1.

The first and second rectifier switches Q1, Q2 may have substantial intrinsic capacitances (represented by the first and second intrinsic capacitors C1, C2). The amount of energy that is stored in the first and second intrinsic capacitors C1, C2 each switching cycle (as the first and second rectifier switches Q1, Q2 are turned ON and OFF) is related to the conduction losses experienced by the synchronous rectifier 430. To increase the efficiency of the power converter 400, a substantial portion of the energy stored in the first and second intrinsic capacitors C1, C2 should be recovered each switching cycle. Further, the turn ON and turn OFF of the first and second rectifier switches Q1, Q2 should be synchronized with the operation of the power switch 415 and the auxiliary switch 420.

The drive circuit 440 turns ON the first switch Q3 of the switching circuit 250 to form a first conductive path for energy to be resonantly transferred through the second control terminal (of the second rectifier switch Q2) and the bias energy source BAT1, through the first blocking diode D1, the first switch Q3, the inductor L1 and the blocking capacitor C3, to the first control terminal (of the first rectifier switch Q1). As the second input capacitance C2 discharges through the second control terminal, the second rectifier switch Q2 turns OFF. The energy charges the first intrinsic capacitor C1 (associated with the first rectifier switch Q1) causing the voltage at the first control terminal (of the first rectifier switch Q1) to increase, thereby turning ON the first rectifier switch Q1. The first blocking diode D1 blocks the reverse flow of current to the bias energy source BAT1, resulting in a first half-cycle of resonant current flow to charge the first intrinsic capacitor C1. Additionally, the second switch Q4 is OFF, also blocking current flow. Once the first intrinsic capacitor C1 has been resonantly charged, the first switch Q3 can be turned OFF (after the first half-cycle of resonant current flow).

When the first rectifier switch Q1 is to be turned OFF and the second rectifier switch Q2 is to be turned ON, the second switch Q4 is turned ON to form a second conductive path for energy to be resonantly transferred through the first control terminal (of the first rectifier switch Q1), through the blocking capacitor C3, the inductor L1, the second switch Q4 and the second blocking diode D2, to the second control terminal (of the second rectifier switch Q2). As the first input capacitance C1 discharges through the first control terminal, the first rectifier switch Q1 turns OFF. The energy charges the second intrinsic capacitor C2 (of the second rectifier switch Q2) causing the voltage at the second control terminal (of the second rectifier switch Q2) to increase, thereby turning ON the second rectifier switch Q2. The turn ON of the second switch Q4 allows a second half-cycle of resonant current flow to discharge the first intrinsic capacitor C1. The second blocking diode D2 blocks reverse current flow to the switching circuit 450 and thus terminates the second half-cycle of resonant current flow. Once the first intrinsic capacitor C1 has been resonantly discharged, the second switch Q4 can be turned OFF (after the second half-cycle of resonant current flow).

By employing a resonance between the inductor L1 and the first and second intrinsic capacitors C1, C2, the transfer of energy to and from the first and second rectifier switches Q1, Q2 may be done in a substantially lossless manner.

Those skilled in the art should understand that the previously described embodiments of the power converter and drive circuit are submitted for illustrative purposes only and other embodiments are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

The principles of the present invention may be applied to a wide variety of power circuit topologies, including circuit topologies not employing an active clamp. Additionally, the drive circuit of the present invention may be used with various half bridge, full bridge, flyback, and boost converter topologies employing discrete or integrated magnetics. For a better understanding of a variety of power converter topologies employing discrete and integrated magnetic techniques, see, *Modern DC-to-DC Switchmode Power Converter Circuits*, by Rudolph P. Severns and Gordon Bloom, Van Nostrand Reinhold Company, New York, N.Y. (1985), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. For use with a synchronous rectifier having at least one rectifier switch, a drive circuit for driving said rectifier switch, comprising:

a blocking diode couplable to a bias energy source and configured to block reverse current flow thereto;

an inductor coupled to said rectifier switch; and a switching circuit, coupled to said blocking diode and said inductor, configured to:

resonantly transfer energy from said bias energy source to a control terminal of said rectifier switch via said inductor to turn said rectifier switch ON, and resonantly discharge said energy through said control terminal to turn said rectifier switch OFF.

2. The drive circuit as recited in claim 1 wherein said switching circuit comprises series-coupled first and second switches, said first switch configured to resonantly transfer said energy from said bias energy source to said control terminal via said inductor to turn said rectifier switch ON, said second switch configured to resonantly discharge said energy through said control terminal to turn said rectifier switch OFF.

3. The drive circuit as recited in claim 1 wherein said blocking diode is a first blocking diode coupled to a first terminal of said bias energy source, said drive circuit further comprising a second blocking diode coupled between said switching circuit and a second terminal of said bias energy source.

4. The drive circuit as recited in claim 1 wherein said bias energy source comprises a bias capacitor coupled thereacross.

5. The drive circuit as recited in claim 1 further comprising a blocking capacitor coupled between said switching circuit and said control terminal of said rectifier switch.

6. The drive circuit as recited in claim 1 further comprising a clamping circuit coupled to said rectifier switch.

7. The drive circuit as recited in claim 6 wherein said clamping circuit comprises a diode.

8. The drive circuit as recited in claim 7 wherein said clamping circuit further comprises a Zener diode series-coupled in opposition to said diode.

9. The drive circuit as recited in claim 6 further comprising a voltage source coupled to said clamping circuit.

10. The drive circuit as recited in claim 6 wherein said clamping circuit further comprises a bleeder resistor coupled to said control terminal of said rectifier switch.

11. For use with a synchronous rectifier having at least first and second rectifier switches, a drive circuit for driving said first and second rectifier switches, comprising:

a blocking diode couplable to a bias energy source and configured to block reverse current flow thereto;

an inductor coupled to said first rectifier switch; and a switching circuit, coupled to said blocking diode and said inductor, configured to:

resonantly transfer energy through a second control terminal of said second rectifier switch and said bias energy source to a first control terminal of said first rectifier switch via said inductor to turn said second rectifier switch OFF and said first rectifier switch ON, and resonantly transfer said energy through said first control terminal to said second control terminal to turn said first rectifier switch OFF and said second rectifier switch ON.

12. The drive circuit as recited in claim 11 wherein said switching circuit comprises series-coupled first and second switches, said first switch configured to resonantly transfer said energy through said second control terminal and said bias energy source to said first control terminal via said inductor to turn said second rectifier switch OFF and said first rectifier switch ON, said second switch configured to resonantly transfer said energy through said first control terminal to said second control terminal to turn said first rectifier switch OFF and said second rectifier switch ON.

13. The drive circuit as recited in claim 11 further comprising a second blocking diode coupled between said switching circuit and said second control terminal of said second rectifier switch, said second blocking diode configured to block reverse current flow to said switching circuit.

14. The drive circuit as recited in claim 11 wherein said bias energy source comprises a bias capacitor coupled thereacross.

15. The drive circuit as recited in claim 11 further comprising a blocking capacitor coupled between said switching circuit and said first control terminal of said first rectifier switch.

16. The drive circuit as recited in claim 11 further comprising first and second clamping circuits coupled to said first and second rectifier switches, respectively.

17. The drive circuit as recited in claim 16 wherein at least one of said first and second clamping circuits comprises a diode.

18. The drive circuit as recited in claim 17 wherein said at least one of said first and second clamping circuits further comprises a Zener diode series-coupled in opposition to said diode.

19. The drive circuit as recited in claim 16 further comprising a voltage source coupled to at least one of said first and second clamping circuits.

20. The drive circuit as recited in claim 16 wherein at least one of said first and second clamping circuits comprises a bleeder resistor.

21. For use with a synchronous rectifier having at least one rectifier switch, a method of driving said rectifier switch, comprising:

resonantly transferring energy from a bias energy source, via a first conductive path including an inductor, to a control terminal of said rectifier switch to turn said rectifier switch ON;

alternately resonantly discharging said energy through said control terminal via a second conductive path to turn said rectifier switch OFF; and blocking reverse current flow to said bias energy source.

22. The method as recited in claim 21 wherein said first conductive path is provided by conduction of a first switch of a switching circuit and said second conductive path is provided by conduction of a second switch of said switching circuit.

23. The method as recited in claim 22 further comprising blocking reverse current flow to said switching circuit.

24. The method as recited in claim 22 further comprising blocking DC current with a blocking capacitor coupled between said switching circuit and said control terminal of said rectifier switch.

25. The method as recited in claim 21 further comprising storing at least a portion of said energy within a bias capacitor coupled across said bias energy source.

26. The method as recited in claim 21 further comprising clamping a voltage excursion of a drive signal supplied to said control terminal of said rectifier switch.

27. The method as recited in claim 26 wherein said clamping comprises clamping a lower voltage excursion of said drive signal.

28. The method as recited in claim 26 wherein said clamping comprises clamping an upper voltage excursion of said drive signal.

29. The method as recited in claim 26 further comprising biasing a clamping voltage associated with said clamping.

30. The method as recited in claim 26 wherein said clamping further comprises bleeding a voltage associated with said clamping.

31. A power converter, comprising:

a power switch, a synchronous rectifier coupled to said power switch and having at least one rectifier switch; and a drive circuit for driving said rectifier switch, including:
- a first blocking diode couplable to a first terminal of a bias energy source and configured to block reverse current flow thereto;
- an inductor coupled to said rectifier switch;
- a switching circuit, coupled to said first blocking diode and said inductor, configured to:
  - resonantly transfer energy from said bias energy source to a control terminal of said rectifier switch via said inductor to turn said rectifier switch ON, and
  - resonantly discharge said energy through said control terminal to turn said rectifier switch OFF; and
- a second blocking diode coupled between said switching circuit and a second terminal of said bias energy source.

32. The power converter as recited in claim 31 wherein said switching circuit comprises series-coupled first and second switches, said first switch configured to resonantly transfer said energy from said bias energy source to said control terminal via said inductor to turn said rectifier switch ON, said second switch configured to resonantly discharge said energy through said control terminal to turn said rectifier switch OFF.

33. The power converter as recited in claim 31 wherein said drive circuit further comprises a blocking capacitor coupled between said switching circuit and said control terminal of said rectifier switch.

34. The power converter as recited in claim 31 wherein said drive circuit further comprises a clamping circuit, including a diode, coupled to said rectifier switch.

35. The power converter as recited in claim 34 wherein said clamping circuit further comprises a Zener diode series-coupled in opposition to said diode.

36. A power converter, comprising:

an inverter;

a transformer having a primary winding coupled to said inverter;

a synchronous rectifier coupled to a secondary winding of said transformer and having at least one rectifier switch; and a drive circuit for driving said rectifier switch, including:
- a first blocking diode coupled to a first terminal of a bias energy source and configured to block reverse current flow thereto;
- an inductor coupled to said rectifier switch;
- a switching circuit, coupled to said blocking diode and said inductor, configured to:
  - resonantly transfer energy from said bias energy source to a control terminal of said rectifier switch via said inductor to turn said rectifier switch ON, and
  - resonantly discharge said energy through said control terminal to turn said rectifier switch OFF; and
- a second blocking diode coupled between said switching circuit and a second terminal of said bias energy source.

37. The power converter as recited in claim 36 wherein said switching circuit comprises series-coupled first and second switches, said first switch configured to resonantly transfer said energy from said bias energy source to said control terminal via said inductor to turn said rectifier switch ON, said second switch configured to resonantly discharge said energy through said control terminal to turn said rectifier switch OFF.

38. The power converter as recited in claim 36 wherein said drive circuit further comprises a blocking capacitor coupled between said switching circuit and said control terminal of said rectifier switch.

39. The power converter as recited in claim 36 wherein said drive circuit further comprises a clamping circuit, including a diode, coupled to said rectifier switch.

40. The power converter as recited in claim 39 wherein said clamping circuit further comprises a Zener diode series-coupled in opposition to said diode.

* * * * *